US010651928B2

United States Patent
Kay et al.

(10) Patent No.: US 10,651,928 B2
(45) Date of Patent: May 12, 2020

(54) SYSTEM AND METHOD OF ADAPTIVE INTERFERENCE AVOIDANCE IN MULTI-BEAM SATELLITE COMMUNICATIONS NETWORK

(71) Applicant: Hughes Network Systems, LLC, Germantown, MD (US)

(72) Inventors: Stanley Edward Kay, Rockville, MD (US); Liping Chen, Bethesda, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 206 days.

(21) Appl. No.: 15/849,602

(22) Filed: Dec. 20, 2017

(65) Prior Publication Data

US 2019/0190593 A1    Jun. 20, 2019

(51) Int. Cl.
*H04B 7/185*    (2006.01)
*H04W 72/08*    (2009.01)

(52) U.S. Cl.
CPC ..... *H04B 7/18543* (2013.01); *H04B 7/18513* (2013.01); *H04B 7/18528* (2013.01); *H04B 7/18582* (2013.01); *H04W 72/082* (2013.01)

(58) Field of Classification Search
CPC ........... H04W 72/082; H04W 72/0473; H04W 72/0453; H04W 52/243; H04W 52/241;
(Continued)

(56) References Cited

U.S. PATENT DOCUMENTS

2005/0002324 A1* 1/2005 Sutivong ............... H04L 1/20
370/208
2008/0205544 A1* 8/2008 Berens ............... H04B 1/1036
375/285

(Continued)

FOREIGN PATENT DOCUMENTS

WO    2011021122 A1    2/2011
WO    2016144506 A1    9/2016

(Continued)

OTHER PUBLICATIONS

International Search Report and Written Opinion dated Mar. 27, 2019 by the International Searching Authority (Europea Patent Office) in PCT Application PCT/US2018/006978.

*Primary Examiner* — Faisal Choudhury
(74) *Attorney, Agent, or Firm* — NovoTechIP International PLLC

(57) ABSTRACT

Systems and method are disclosed and among these is a method for mitigation of interference local to remote terminals, and it can include detecting reception of a packet having one of the remote terminals as a destination terminal and, in response, selecting a sub-carrier among the sub-carriers that are not identified as receiving local interference at the destination terminal, and loading, into a queue for the selected sub-carrier, a coded data from which a content of the packet can be derived, and transmitting the queued coded data on the selected sub-carrier. Among disclosed features is a receiving of an interference report that carries an information indicative of a new local interference and, in response, updating the data identifying sub-carriers having local interference at the destination terminal.

14 Claims, 8 Drawing Sheets

(58) Field of Classification Search
CPC ............ H04B 7/18513; H04B 7/18543; H04B 7/18582; H04B 7/18528
USPC ....................................................... 370/317
See application file for complete search history.

(56) References Cited

U.S. PATENT DOCUMENTS

2011/0249569 A1* 10/2011 Mashino .............. H04J 11/0023
370/242
2015/0382364 A1* 12/2015 Sharma ............... H04W 72/082
370/329
2016/0302207 A1* 10/2016 Vasavada ............ H04W 72/082

FOREIGN PATENT DOCUMENTS

WO  2017003944 A1  1/2017
WO  1201773621 A1  10/2017

* cited by examiner

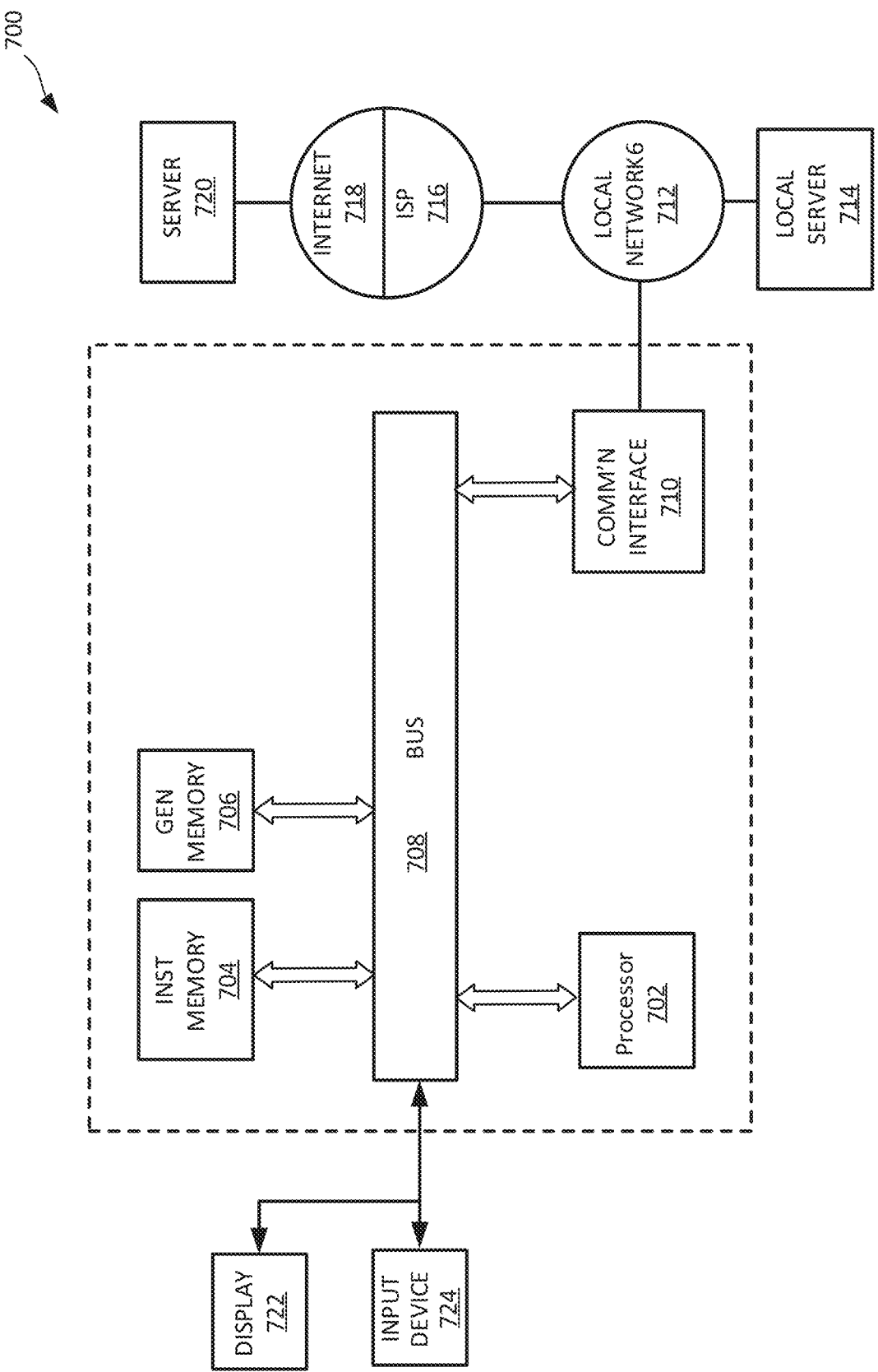

SYSTEM AND METHOD OF ADAPTIVE INTERFERENCE AVOIDANCE IN MULTI-BEAM SATELLITE COMMUNICATIONS NETWORK

BACKGROUND

Satellite Fixed Services (FSS), including Very Small Aperture (VSAT) satellite systems, will continue to coexist with terrestrial wireless communication links, such as microwave tower-to-tower links, and $5^{th}$ Generation (5G) wireless systems. In a star topology, which is common in modern high throughput satellite networks, the gateway site can be protected from interference by appropriate site planning and/or shielding. The remote terminals, though, may be located substantially anywhere and have different cost constraints than gateway sites and therefore can be more susceptible to terrestrial interference.

Directional antennas are one technique that can reduce some types of terrestrial interference to VSAT end user terminals. However, factors including proximity of terrestrial interference sources compared to the propagation distance to the satellite, the current cost-performance for directional VSAT end user antennas, ranges of transmitted power for fielded microwave links, and power limits for satellite beam transmission, can render the directional antenna technique inadequate for a range of applications.

An additional technical matter that bears on the difficulty of an economical solution to this terrestrial interference is that current high throughput satellites typically use a single carrier, with time division multiple access (TDMA), and coding such as Digital Video Broadcast (DVB)-S2x. In an adaptive white Gaussian noise (AWGN) environment, this TDMA implemented DVB-S2x is generally acceptable. However, interference at user terminals from terrestrial microwave towers can be narrowband in comparison to the DVB-S2x bandwidth, which can significantly degrade the current single carrier TDMA approach.

One technique for reducing total signal loss from narrowband interference is to apply a more robust coding. This technique, though, can have technical shortcomings. One is that a more robust coding generally lowers the TDMA signal's effective data rate, not only for the TDMA time slot assigned to the end user terminal receiving the interference, but for all of the TDMA time slots, and therefore for all end users serviced by the TDMA beam. In addition, in certain applications, received interference power level can have such magnitude that robust coding can cease to be a practical solution.

For reasons as identified above, there exists a need for an economical and effective solution to terrestrial narrowband interference at remote end user terminals, particularly in satellite based communication systems.

SUMMARY

This Summary identifies examples of disclosed features and aspects, and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and appended drawings that form a part thereof.

System are disclosed, and provided features and advantages can include mitigation of interference local to remote terminals. Example implementations of one or more disclosed systems can include a memory that can be configured to store a local interference data indicating, for a remote terminal, a local interference to reception of one or more among a plurality of sub-carriers, and can include a sub-carrier assignment logic, which can be configured to determine the remote terminal being a destination terminal for a packet and, in response, to select, based at least in part on the local interference data, a sub-carrier among the sub-carriers not indicated as having local interference to reception at the remote terminal, and generate a sub-carrier assignment data, addressed to the destination terminal, identifying the selected sub-carrier. Implementations of one or more disclosed systems can also include a modulated signal generator that can be configured to generate, based at least in part on a content of the packet, a modulated sub-carrier signal, and a wireless transmitter, which can be configured to wirelessly transmit, for receipt at least at the destination terminal, a sub-carrier assignment notice carrying the sub-carrier assignment data, and an amplified modulated wireless sub-carrier signal based at least in part on the modulated sub-carrier signal.

Methods are disclosed, and provided features and advantages can include mitigation of interference local to remote terminals. Implementations of one or more disclosed methods can include receiving a packet indicating any of the remote terminals as a destination terminal, accessing a given local interference data to determine whether any sub-carriers among a given plurality of sub-carriers are indicated as having local interference to reception at the destination terminal. One or more of such implementations can also include selecting a sub-carrier for sending the packet to the remote terminal, from among the sub-carriers indicated by the local interference data as not having local interference to reception at the destination terminal, and transmitting to the destination terminal a sub-carrier assignment data, identifying the selected sub-carrier, in combination with wireless transmitting, for receipt by at least the destination terminal, a wireless modulation of the selected sub-carrier, the modulation carrying an information from which a content of the packet can be extracted.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is a block diagram that illustrates a computer system upon which aspects of this disclosure may be implemented.

DETAILED DESCRIPTION

In the following detailed description, numerous specific details are set forth by way of examples in order to provide a thorough understanding of the disclosed subject matter. However, it can become apparent to persons of ordinary skill in the art, upon reading this disclosure, that various aspects that are disclosed may be practiced without such details. In other instances, well known methods, procedures, components, and/or circuitry have been described at a relatively high-level, without detail, in order to avoid unnecessarily obscuring aspects of the present teachings.

Figure 1:
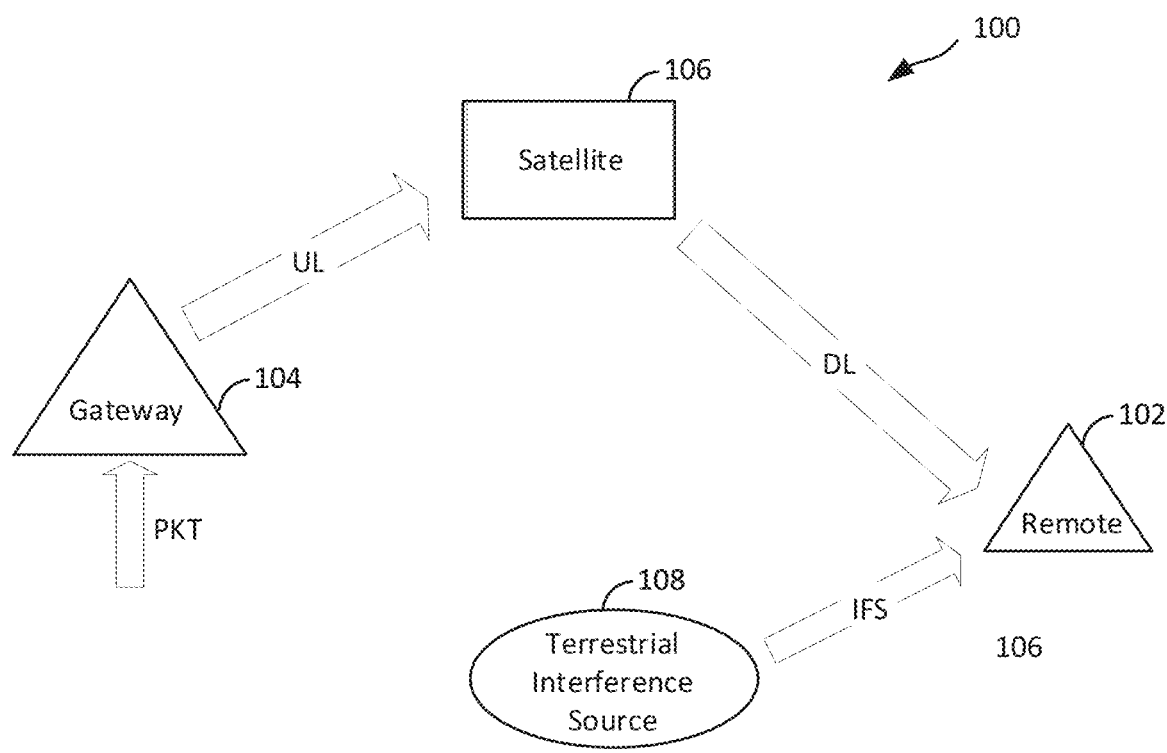
FIG. 1 illustrates an example of a local interference with a remote terminal in a satellite-based communication system.

As described above, one technical problem with Very Small Aperture (VSAT) satellite communication systems can be interference from terrestrial sources, e.g., microwave towers, local to remote terminals, and the substantial costs that can be incurred with current techniques of mitigating such interferences. As an illustrative example, FIG. 1 shows a remote terminal 102 in a satellite-based star network communication system 100 that includes a hub 104 configured to receive packets PK addressed to remote terminal 102, and provide a gateway for such packets to a bent pipe outroute formed by the forward uplink UL to the satellite 106, and the forward downlink DL to the remote terminal 102. The hub 104 can be configured to transmit the packets PK as a wideband signal, during a TDM time slot assigned to the remote terminal 102. However, the FIG. 1 example includes a terrestrial interference source 108, for example, a terrestrial microwave tower, from which the remote terminal 102 receives a narrowband interference signal IFS. If, for example, the terrestrial interference source 108 is sufficiently close to the terminal 102 the received IFS power can degrade the received downlink signal DL such that useful DL content cannot be acceptably recovered.

Current techniques for mitigating such interference can include, as described above, a notch filter (not visible in FIG. 1) inserted in the remote terminal 102, for example, between the terminal's receiving antenna and a first stage of the terminal's downlink receiver. Such notch filters, however, can have technical issues causing a non-ideal filter characteristic, e.g., non-linear phase delay, which can attenuate and distort DL signals that are receiving no interference from IFS. This can substantially reduce the effective bit rate at which DL content can be received by the terminal 102. Another current technique, which is more of a partial compensation than a mitigation, is to apply a more robust encoding of the packet, with or without a smaller constellation modulation of the downlink carrier, to obtain acceptable reception in the presence of the IFS. However, the robustness of coding and, if used, the smaller constellation modulation necessary to obtain acceptable recovery of downlink content in the presence of IFS can be high. This can impose a significant cost in terms of downlink bandwidth.

In an implementation of a system according to the present disclosure, the hub can be configured to receive local interference reports from any of the remote terminals or, for example, from any among a distributed sub-plurality of the terminals. The interference reports can be configured to identify one or more of the sub-carriers being unusable—at the reporting terminal—e.g., due to a microwave tower or other terrestrial interference source. The hub can be configured to maintain a record or database, e.g., a local interference map or equivalent, indicating for each remote terminal which, if any, of the sub-carriers have (or have not) been reported by that terminal (or by a nearby designated terminal) as unusable due to local interference. The hub can be configured to update the interference map, or equivalent record, based on the local interference reports.

In an implementation, the hub can include a sub-carrier assignment logic configured to select—for packets destined for any of the remote terminals—a sub-carrier from among sub-carriers not reported as currently unavailable at the destination due to local interference. The locally available sub-carriers can be referred to as the "candidate sub-carriers" for reaching the destination remote terminal. Metrics and disciplines that can be utilized by the sub-carrier assignment logic in selection and assignment of sub-carriers to include avoidance of queue over-fill and avoidance of queue empty states. These and other sub-carrier assignment features can provide secondary benefits including, but not limited to, control of delay and continuous utilization of all N sub-carriers.

Disclosed systems and methods can provide technical solutions to the above described terrestrial narrowband interference with remote terminals, including an adaptive, location-specific remote terminal interference mitigation.

System implementations can include an interference mitigating hub that can be arranged, for example, as a satellite gateway in a bent-pipe satellite communication system. The interference mitigating hub can be configured to transmit, in one or more TDM (time-division multiplexed) time slots, N sub-carriers on a forward uplink, to the satellite for retransmission by satellite transponders as a forward downlink from the satellite to the remote terminals. The interference mitigating hub can be configured to maintain an updated interference record, for example, a local interference map, having information identifying remote terminals at which one or more sub-carriers are degraded by a local interference. The interference mitigating hub can also be configured to update the local interference map or equivalent record, based on the local interference reports.

In an implementation, the interference mitigating hub can include a sub-carrier assignment logic and, upon receiving a packet, e.g., from the Internet or another WAN (wide area network), to refer to the local interference map for indication of any of the N sub-carriers having been reported as unusable, at any one or more of the remote terminals the packet indicates as a destination. The interference mitigating hub can be configured such that, upon the local interference map indicating one or more of the packet's destination terminals receiving narrowband (e.g., terrestrial) interference, the hub can avoid assigning any sub-carrier for the packet—or for a baseband frame in which the hub can encapsulate the packet—that is reported unusable at any of the destination terminal. The interference mitigating hub can load into the queue for the selected sub-carrier, a coded data from which a content of the packet can be derived. The coded data can be encapsulated, for example in a frame. The transmitter can be configured to transmit the queued coded data on the selected sub-carrier.

In a specific implementation, and in example operations thereof, the packet can be a first packet, the coded data can be a first coded data, the selected sub-carrier can be a first sub-carrier, and the destination terminal can be a first destination terminal. The sub-carrier assignment logic can be further configured to detect reception of a second packet carrying a destination information indicative of another, for example, a second of the remote terminals as its destination terminal. The sub-carrier assignment logic can be configured to respond to the second packet by selecting a second sub-carrier among the sub-carriers, from among sub-carriers not identified as degraded by local interference at the second destination terminal, and loading into the queue for the second sub-carrier a second coded data from which a content of the second packet can be derived. The transmitter can be configured to transmit, concurrently, the queued first coded data on the first sub-carrier and the queued second coded data on the second sub-carrier.

The interference mitigating hub can include an encapsulation logic, configured to encapsulate the packet into a frame, and a modulation-coding logic, configured to encode the frame, based at least in part on a given code, into a series of amplitude phase modulation symbols, and the coded data can be among the amplitude phase modulation symbols.

In an aspect, the sub-carrier assignment logic interference mitigating hub can be configured to adapt the above-described selection and assignment of sub-carriers in response to receiving IP packets that indicate a maximum allowable delay, for example as a parameter of the QoS field. For purposes of description, such packets can be referred to as "delay limited." The sub-carrier assignment logic can be configured such that, upon receiving a delay-limited packet when more than one candidate sub-carrier is available to reach the destination, selection to meet the maximum delay can be based, at least in part, on respective depths of the candidate sub-carrier queues. In addition, the hub can be configured to weigh, in its determination of respective delays of different candidate sub-carriers, the different bit rate capacities resulting from different coding and modulation on different sub-carriers. One example feature can include determining delays, and performing sub-carrier assignment further based on a combination of queue depths and sub-carrier bit rate.

Figure 2:
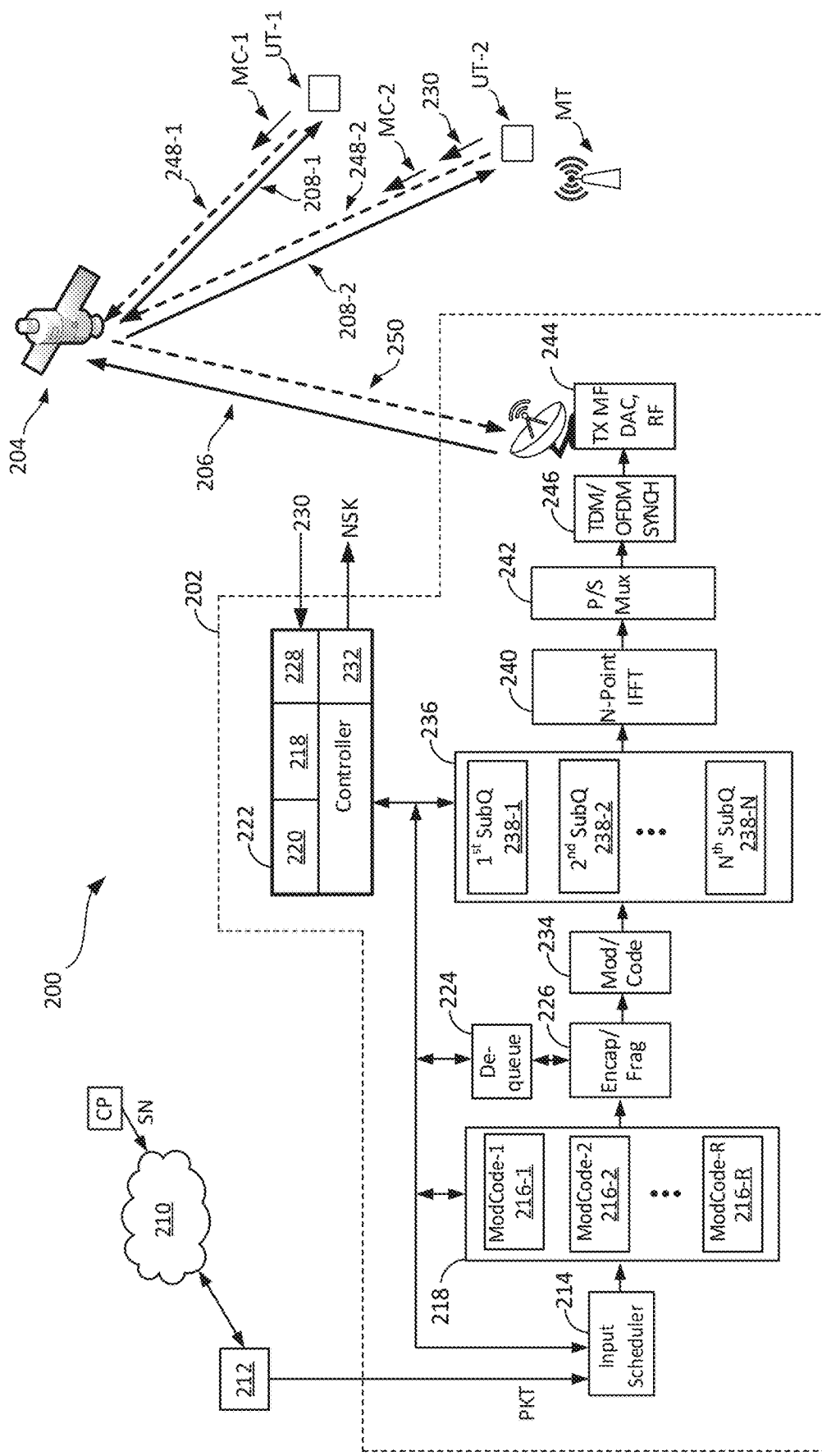
FIG. 2 illustrates a functional block diagram of an example implementation of one adaptive multiple sub-carrier hub, in an implementation of one system for adaptive location-specific interference mitigation according to various aspects.

FIG. 2 illustrates one example communication system 200 that can include a satellite gateway (SGW) 202, which can include structure configured to provide, and to perform various processes in and further to adaptive local interference mitigation according to various aspects. The SGW 202 will therefore also be referred to as the "adaptive local interference mitigating" SGW 202" or "ALM SGW" 202. It will be understood that "ALM," as used in this disclosure, is a label introduced for convenience of description, and has no inherent or otherwise limitative meaning in this written description or in the scope of the appended claims.

The ALM GW 202 and a satellite 204 can be in a bent-pipe arrangement that can include an uplink 206 to the satellite 204, for re-transmission (e.g., by satellite transponders (not separately visible in FIG. 2)) over one or more downlinks, such as the example downlinks 208-1 and 208-2 (generically "downlinks 208"), to remote terminals such as the representative examples UT-1 and UT-2 (generically "remote terminals UT"). It will be understood that UT-1 and UT-2 are representative examples from what can be a far larger population, e.g., tens of thousands, of VSAT user terminals, which can be distributed over significant geographical areas.

In an aspect, the ALM SGW 202 can be configured to receive packets, for example, IP (Internet Protocol) packets "PKT" from a wide area network (WAN) 210 to which the SGW 202 can connect, e.g., through a network interface device 212. The IP packets PKT can be provided, for example, by content providers, such as the example content provider CP.

The ALM SGW 202 can include an input scheduler logic 214, which can be configured to receive IP packets PKT, and to load the packets PKT into particular ones among R queues, such as the examples illustrated in FIG. 2 as "ModCode-1" 216-1, "ModCode-2" 216-2, . . . "ModCode-R" 216-R (generically "ModCode queues 216"). The ModCode queues 216 can be within, or can be associated with a queueing device 218, which will be referred to as a "ModCode queueing device 218." It will be understood that the term "ModCode" is a name used for convenience in description, and does not define any particular architecture, structure, or technology for the ModCode queues 216, or for the ModCode queueing device 218. It will also be understood that the term "device," as used herein in the context of "ModCode queueing device" 218, and in other contexts, can mean a logical function or association, and does not necessarily imply any corresponding structure.

Each of the R ModCode queues 216 can correspond to a particular modulation-coding pair, which is a pairing of a particular coding and a particular modulation that, as will be described in greater detail later, the ALM SGW 202 can apply in subsequent transmission of the packet PKT, e.g., over the uplink 206. In an aspect, and as will also be described in greater detail, the ALM SGW 202 can include logic configured to include with the transmitted packet an indicator of the modulation-coding. Regarding the types of coding and modulation that can be defined by the modulation-coding pair, it will be understood that these can be in a range that can be established, or limited, by the encapsulation frame protocol the ALM SGW 202 is chosen to apply in transmitting content of the packets PKT. For example, in one or more implementations of the ALM SGW 202, an encapsulation logic can be included, and contemplated configurations thereof can include, but are not limited to, DVB-S2 (Digital Video Broadcasting—Satellite-Second-Generation) standard EN 302 307 part 1, set by ETSI (European Telecommunications Standards Institute) which is hereby incorporated herein by reference, in its entirety. In such implementations, the range of codings that can be defined by the modulation-coding pair can include, but are not limited to, various LDPC (low density parity check codes), and the range of the defined modulations can include various amplitude-phase shift key modulations such as, but not limited to, e.g., BPSK (binary phase shift keying), and QPSK (quadrature phase shift keying). In one alternative implementation, baseband frame encapsulation logic can be configured to encapsulate the packets PKT into baseband frames according to the DVB-S2x (DVB-S2-extended) standard EN 302 307, part 2, also set by ETSI, and which is hereby incorporated herein by reference, in its entirety. To avoid repeated recitation of "DVB-S2 and/or DVB-S2x," subsequent recitations of "DVB-S2x" will be understood to mean "DVB-S2 and/or DVB-S2x," except in instances, if any, where another meaning is made clear by its context. It will be understood that DVB-S2 and DVB-S2x are only for purposes of example and are not intended to limit practices according to disclosed concepts and aspects to this example.

In an implementation, the input scheduler logic 214 can be configured to select among the ModCode queues 216 based, for example, on ModCode assignment instructions (not separately visible in FIG. 2) that can be generated by a processing resource such as the illustrated modulation-coding pair assignment logic 220. The modulation-coding pair assignment logic 220 can be configured to select the coding and modulation based on a request earlier sent by the destination terminal. FIG. 2 illustrates examples of such requests as MC-1 sent by UT-1 and MC-2 sent by UT-2. Generation of MC-1 and MC-2 can be, but is not necessarily, in accordance with conventional DVB-2Sx techniques. In one or more implementations, the input scheduler logic 214 can be configured to respond to each IP packet PKT by sending the packet's destination, and certain other packet information (e.g., QoS parameters), to the modulation-code pair assignment logic 220, and then waiting for a ModCode assignment instruction from the logic 220. In one alternative or supplemental implementation, the modulation-coding pair assignment logic 220 can be configured to generate the corresponding ModCode assignment, for example, on information that can include general channel conditions (not necessarily specific to narrowband interference) for propagating the downlink(s) to the destination terminals, and/or QoS (Quality of Service) parameters, e.g., maximum frame error or bit error rates, included with or otherwise associated with the IP packets PKT. In such an implementation, the notice of the modulation-coding pair can be transmitted to the destination terminal. The modulation-coding pair assignment logic 220 can be implemented, for example, with processor-executable instructions that can be stored in a memory (not separately visible in FIG. 2), of a controller 222 that can also include a general purpose programmable processor (not separately visible in FIG. 2) coupled to that memory.

The ALM SGW 202 can include a processing resource, such as the example output scheduler-ModCode de-queueing logic 224, configured to de-queue packets from the ModCode queueing device 218. The output scheduler-ModCode de-queueing logic 224 can be implemented, for example, as a dedicated logic circuit (not separately visible in FIG. 2). Such implementations can include, for example, circuitry that can be incorporated in the queueing device 218. The output scheduler-ModCode de-queueing logic 224 can, as one alternative, be implemented by a processing resource of the ALM SGW 202, for example, as additional processor-executable instructions stored in the above-identified memory (not separately visible in FIG. 2) of the controller 222.

Exemplary functionalities of the output scheduler-ModCode de-queueing logic 224 can include a de-queueing of the IP packets based, at least in part, on the packets' relative priorities. One example means for determining such priorities can include, without limitation, configuring the output scheduler-ModCode de-queueing logic 224 or other resources of the ALM SGW 202 to inspect appropriate QoS parameters of the IP packets. In addition, the ModCode queueing device 218, the output scheduler-ModCode de-queueing logic 224, or both, or another resource of the ALM SGW 202, can include a logic configured as one or more timers (not separately visible in FIG. 2) for each of the ModCode queues 216. Such timers can be referenced, for purposes of this description, as "time-in-queue" timers. The time-in-queue timers can be configured, for example, such that loading an IP packet into one of the ModCode queues 216 resets and associates one of that queue's time-in-queue timers with that IP packet. The output scheduler-ModCode de-queueing logic 224 can be configured to de-queue IP packets from the ModCode queueing device 218 based further, at least in part, on the current count value of the IP packets' respective time-in-queue timers. In a related aspect, the output scheduler—ModCode de-queueing logic 224, or the ModCode queueing device 218 can be configured with a time-out feature that, based on the time-in-queue counters and IP packet maximum delay parameters, can identify IP packets that have reached, or are nearing, time-out, and to apply a de-queueing discipline to the ModCode queues 216 that includes avoidance of time-outs.

In implementations where the ModCode queues 216 are configured to hold more than one IP packet, the above-described logic can be configured to provide a separate time-in-queue timer for each of such IP packets. In an example implementation, the output scheduler-ModCode de-queueing logic 224, the ModCode queues 216, or the ModCode queueing device 218 can be configured to provide S time-in-queue timers for each ModCode queue 216, "S" being an integer. It will be understood that the time-in-queue timers, if included, are not necessarily discrete, or dedicated timer devices. For example, such timers can be implemented as virtual registers (not separately visible in FIG. 2), stored in a memory such as the memory introduced above controlled by a resource such as the controller 222 together with appropriate machine-readable instructions, stored for access and execution by a microprocessor, e.g., in controller 222. Such instructions can be configured such that execution by that microprocessor can cause operations including loading, resetting, and incrementing by a counting clock (not separately visible in FIG. 2) in accordance with the time-in-queue functions described above.

As described above, the ALM SGW 202 can be configured to encapsulate IP packets PKT, or content from such packets, in frames, for downlink transmission to their destination terminals. Referring to FIG. 2, an example implementation can include an encapsulation logic 226 configured, for example, to receive IP packets PKT as they are being de-queued by the output scheduler-ModCode de-queueing logic 224 from ModCode queues 216. For the DVB-S2x protocol example referenced above, the encapsulation logic 226 can be configured to apply GSE (Generic Stream Encapsulation) operations to convert the IP packets into GSE packets, and to encapsulate one or more of those GSE packets into a DVB-S2x BB (baseband) encapsulation frame. In an implementation, the encapsulation logic 226 can be configured to insert in the encapsulation frame an identifier for the modulation coding pair selected and assigned by the modulation-coding pair assignment logic 220, as described above. As described in greater detail later in this disclosure, subsequent logic operations of the ALM SGW 202 can utilize the inserted modulation coding pair identifier.

Referring again to the encapsulation logic 226, exemplary operations according to one or more aspects can include instances in which multiple IP packets being de-queued from a particular ModCode cache 216, for conversion to GSE packets and encapsulation in frame, e.g., the DVB-S2x BB (baseband) frame, can be addressed to the same particular destination terminal, e.g., UT-1. In another aspect, one or more of the IP packets converted to GSE packets for encapsulation in the DVB-S2x BB can be addressed to a first of the remote terminals, e.g., UT-1, and another one or more of the GSE packets of the IP packets converted to GSE packets and inserted into that same DVB-S2x BB can be addressed to a second of the remote terminals, e.g., UT-2. In that example, both UT-1 and UT-2 can receive and demodulate the DVB-S2x BB, but UT-1 can identify and therefore further process only the GSE packet(s) addressed to it, without further expending processing resources on the remaining GSE packets. Likewise, UT-2 can identify and therefore expend resources on further processing only the GSE packet(s) addressed to it. Also, in an aspect, the encapsulation logic 226 can be configured to carry, e.g., in the DVB-S2x B frame, one or more IP packets that are multi-cast, for example, to a group of the remote user terminals.

As described above, conventional DVB-S2x transmission can use a single carrier TDM for sending packets through a conventional satellite gateway to a satellite-based bent pipe arrangement. There can be a technical problem, though, due to narrowband interference at remote terminals, e.g., from terrestrial microwave towers near the terminals, which can significantly degrade their reception of the single carrier. Implementations according to the disclosed ALM SGW 202 and its various aspects and features, can provide an adaptive local interference mitigation that can significantly overcome this technical problem. The aspects and features can include transmitting, in one or more TDM time slots, a multiple sub-carrier outroute that can carry traffic to such remote terminals on sub-carriers outside of the narrowband interference, to which these remote terminals can listen. In a related aspect, also described in greater detail later in this disclosure, the ALM SGW 202 can include resources for sending to such remote terminals a notice identifying the particular sub-carrier(s) on which their traffic will be carried—at least until the interference ceases. Further to this aspect, the ALM SGW 202 can be configured to receive reports of such interference at the remote terminals, and based on these, to maintain an updated record, such as the example terminal interference map 228 indicating which of the remote terminals is receiving local interference, and characterizing that interference with sufficient detail such that assignment of sub-carriers(s) for such terminals can avoid sub-carriers that are likely not usable due to the interference.

Figure 3:
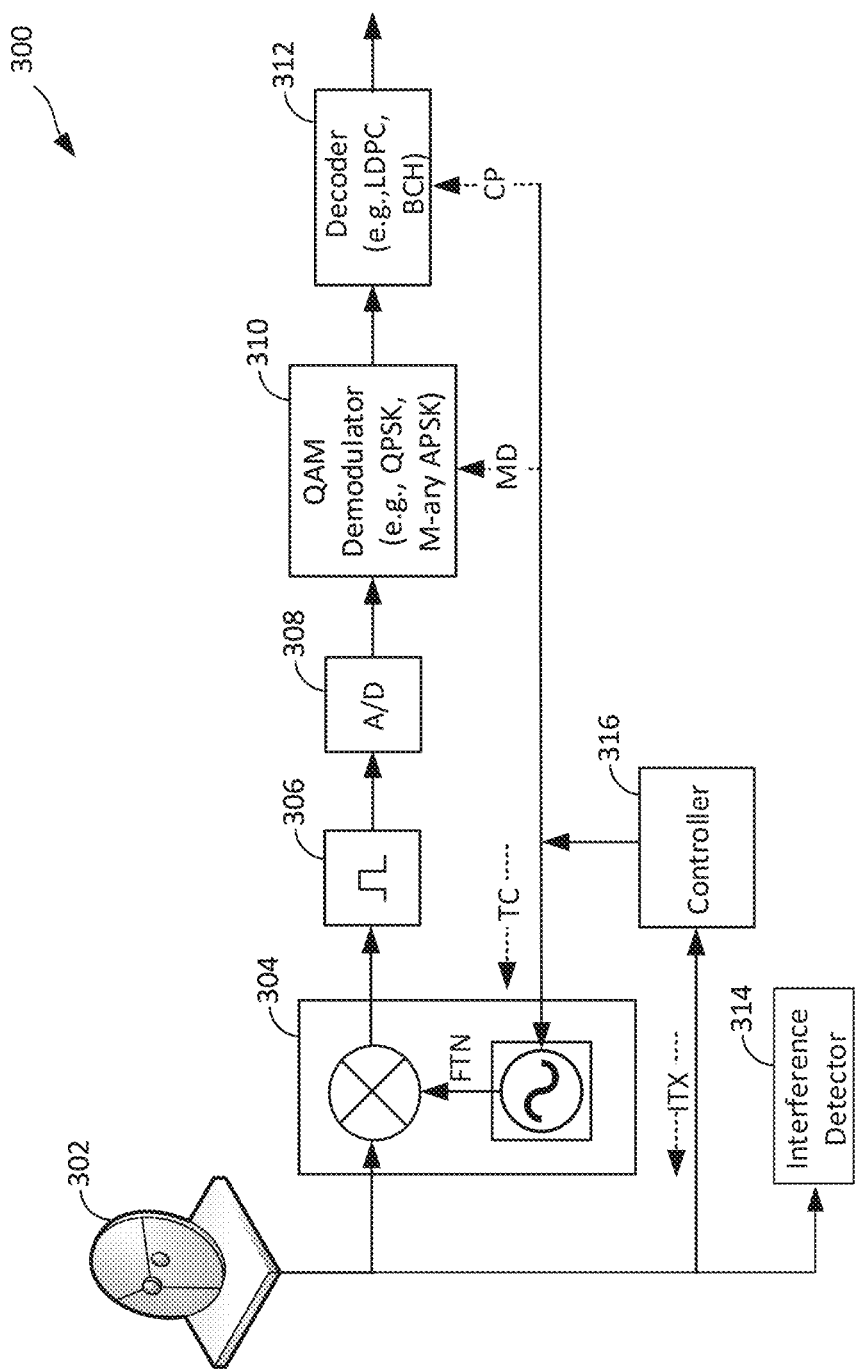
FIG. 3 illustrates a functional block diagram of one example implementation of an interference scanning and reporting remote terminal, for one or more systems for adaptive location-specific interference mitigation according to various aspects.

FIG. 2 shows an example local interference report 230, generated by UT-2 (for example from a UT-2 interference detection process, as described in greater detail in reference to the attached FIG. 3), that can detect interference from the illustrated terrestrial interference source "MT." The source MT can be, for example, a terrestrial microwave tower. Generation of the local interference reports 230 can be configured to an identify the location of receiving the interference, e.g., the geolocation of UT-2, or an information from which the ALM SGW 202 can determine the location, e.g., a unique identifier of UT2 and an accessible cross-reference of that identifier to the UT-2 geolocation. In one example alternative implementation, the ALM SGW 202 can maintain a cache (not visible in FIG. 2) or an equivalent record identifying all end user terminals from which an interference report has been received that indicated one or more of the sub-carriers being unavailable. In such an implementation, the ALM SGW 202 can be configured to assume that if the destination terminal does not have a still-active interference report in the cache, it is able to receive on all N of the sub-carriers In one or more implementations of the adaptive local interference mitigation, and various aspects thereof, the ALM SGW 202 can include a sub-carrier selection logic 232 that can be configured to access the terminal interference map 228 and, based at least in part on same, select and assign a particular one of or more of N sub-carriers. The sub-carrier selection logic 232 can be configured to perform this process upon detecting or being notified, e.g., by the input scheduler logic 214, of arrival of an IP packet PKT. In an alternative implementation, the sub-carrier selection logic 232 can be configured to cooperate with the output scheduler-ModCode de-queueing logic 224 and encapsulation logic 226 e.g., to access the terminal interference map 228 and, based at least in part on the map 228, select and assign a sub-carrier to the encapsulation frame for the IP packet PKT.

As described above, the ALM SGW 202 can be configured to insert, either in each IP packet PKT, or in the frame in which the IP packet is later encapsulated, an indicator of the sub-carrier to which its encapsulating frame will be assigned. This sub-carrier identifier can be in addition to the above-described inserted identifier for the modulation-coding pair selected and assigned by the modulation-coding pair assignment logic 220. In the above-described implementation configuring the sub-carrier selection logic 232, output scheduler-ModCode de-queueing logic 224, and encapsulation logic 226 for co-operative operation in selecting a sub-carrier, one such configuration can include, in the encapsulation process, insertion of the sub-carrier indicator. With respect to the sub-carrier selection logic 232, in one or more implementation it can be configured to receive an indication of the destination terminal's current receive symbol rate, or to access a current record (not separately visible in FIG. 2) of that rate, or both. The sub-carrier selection logic 232 can be correspondingly configured to include in its sub-carrier selection process a weighing of the destination terminal's current receive symbol rate, in addition to constraints defined or set by the terminal interference map 228. It will be understood that for encapsulation frames that may be received by multiple remote terminals having different current receive symbol rates, there may instances in which the slowest of these rates may be used as a limit. Also, as will be described in greater detail in later paragraphs, implementations of the ALM SGW 202 can include a queue for each of the N sub-carriers, and logic to monitor or track the current depth of each of the N sub-carrier queues. Together with such an implementation, the sub-carrier selection logic 232 can be configured with, and to apply one or more sub-carrier selection processes that can weigh, or otherwise factor the respective depths of the sub-carrier queues, together with the constraints defined or set by the terminal interference map 228. In addition, as will also described in greater detail in later paragraphs, the ALM SGW 202 can be configured to receive IP packets having maximum delay parameters, and accordingly, the sub-carrier selection logic 232 can be configured with, and to apply one or more sub-carrier selection processes that can weigh or otherwise factor, in combination, the IP packets' delay constraints and the respective depths of the sub-carrier queues (in addition to the destination terminal's current receive symbol rate, if desired), together with the constraints defined or set by the terminal interference map 228.

The encapsulation logic 226 can be configured to feed the encapsulation frames, e.g., the above-described DVB-S2x BB encapsulation frames, to a coding/modulation logic 234 that can be configured to apply, to the encapsulation frame, the coding and modulation corresponding to the ModCode queue 216 in which the frame's constituent IP packets were queued. This operation pf the encapsulation logic 226 can be, for example, under control of the ModCode de-queueing aspects of the output scheduler-ModCode de-queueing logic 224. In an implementation, the coding/modulation logic 234 can also be configured to determine the coding and modulation for the encapsulation frame from the encapsulation logic 226 based, at least in part, on the above-described modulation-coding pair indication that can be inserted in or appended to the IP packets within the encapsulation frame by the input scheduler logic 214.

As described above, in an aspect, the output scheduler-ModCode de-queueing logic 224 can be configured to de-queue IP packets from the ModCode queueing device

218 based at least in part on their relative priorities. Implementations for determining such priority can include, but are not limited to, inspecting QoS parameters that can be appended to or inserted in the IP packets, for example, by the content provider CP.

Associated with the sub-carrier selection and assignment, and with subsequent transmission of the BB frames on their assigned sub-carrier, the ALM SGW 202 can be configured with an input queue for each of the N sub-carriers, as illustrated in FIG. 2 by the sub-carrier queueing device 236 and its N sub-carrier queues, shown as a first sub-carrier queue 238-1, second sub-carrier queue 238-2, . . . Nth sub-carrier queue 238-N (collectively "sub-carrier queues 238").

In an implementation, the sub-carrier selection logic 232 can be configured to select sub-carriers with an objective of continuously utilizing all N sub-carriers, e.g., not letting any of the N sub-carrier queues 238 become empty. Stated differently, the sub-carrier selection logic 232 can be configured to select sub-carriers with an objective of continuous full occupation of the aggregate bandwidth of the N sub-carrier outroute bandwidth. Accordingly, the sub-carrier selection logic 232 can be configured to monitor the fill depth of the N sub-carrier queues 238. Alternatively, other resources of the ALM SGW 202—such as the sub-carrier queuing device 236—can be configured to detect and provide that fill depth of the sub-carrier queues 238 to the sub-carrier selection logic 232.

In one or more implementations, the sub-carrier selection logic 232 can be configured to also apply minimal delay as a sub-carrier assignment discipline. Accordingly, the sub-carrier assignment logic 218 can be configured such that when a choice of more than one sub-carrier exists, the sub-carrier having a sub-carrier queue 238 with the minimum delay can be chosen. Also, as described above, in an implementation, the sub-carrier selection logic 232 can be configured to receive an indication of the destination terminal's current receive symbol rate, or to access a current record of that rate, or both and, therefore, configuration with a minimal delay sub-carrier assignment discipline can include a weighing of the destination terminal's current receive symbol rate.

One variation of the above-described implementation of the sub-carrier assignment logic 218 can be an adaptation where the delay objective is not necessarily the minimum among all the available sub-carriers but, instead, is only that the sub-carrier provides a delay that meets a do-not-exceed delay parameter for the frame (e.g., specified by a QoS of the frame's constituent IP packets).

In one or more implementations, the modulation-coding assignment instruction logic 218 and sub-carrier selection logic 232 can be configured to utilize various common information in performing their respective functions and operations thereof. For example, the modulation-coding pair assignment logic 220 can be configured to select a modulation-coding pair selection based, at least in part, on the identity of the destination terminal, as well as a maximum permissible delay (if any) indicated by, or otherwise associated with the baseband encapsulation frame. In an implementation, the modulation-coding pair assignment logic 220 can be configured to receive or to access information on a channel condition, (e.g., degradation due to rain) of the first downlink 208 or second downlink 210 propagation path to the packet's destination terminal, and to base its selecting of the packet's modulation-coding pair based, at least in part, on that information.

Referring again to FIG. 2, in an aspect, the sub-carrier queueing device 236 can interface to and feed a modulated sub-carrier signal generator implemented, for example, by N-point IFFT (Inverse Fast Fourier Transform) block 240. The FI.2 IFFT block 240 can be configured such that, at every clock event or instance (e.g., rising or falling edge) of a system clock (not visible in FIGS. 2A-2B), the sub-carrier queueing device 236 can perform a concurrent de-queueing iteration that can load, from each of the N sub-carrier queues 238 to a corresponding one of the N inputs of the IFFT block 240, an I-Q value representing another M-ary APSK symbol from a frame in that queue 238. Accordingly, N frames can be de-queued concurrently from the N sub-carrier queues 238 to the N-point IFFT block 240 and, at each of the de-queuing iterations, the N-point IFFT block 240 can produce a time sample for each of N modulated sub-carriers, each time sample carrying information from which one M'ary APSK symbol of the frame assigned to the sub-carrier can be recovered by its destination terminal. The destination terminal can perform the recovery because it has knowledge of the sub-carrier, based on notice it received from the ALM SGW 202, as described above, and because the modulation-code pair assignment logic 220 can select the modulation-coding pair based on a request earlier received from the destination terminal.

In the FIG. 2 ALM SGW 202, the N parallel time-domain outputs of the N-point IFFT block 242 can be converted to a serial stream by an N:1 P/S (parallel to serial) multiplexer 242 that, in turn, can feed a digital-in, RF (radio frequency)-out transmitter device 244 having a DAC (digital-to-analog) converter and a multi sub-carrier RF transmitter. In an aspect, a TDM/OFDM (orthogonal frequency division multiplexing) timing block 246 can insert timing information, for example, using pilot tone and techniques such as, but not limited to, techniques specified ETSI TS 102 585 V1.2.1 which is hereby incorporated herein by reference, in its entirety. The analog output of the DAC of the digital-in, RF-out transmitter device 244 can be a superposition of N modulated sub-carriers, each carrying a corresponding one of N frames, which the multi sub-carrier RF transmitter of the device 244 can transmit from its transmission dish (visible but not separately labeled) as the forward uplink 204 to the satellite 206.

Upon the coding and modulation scheme to be applied to an encapsulation frame being provided to or determined by the coding/modulation logic 234, specific operations by that logic 234 in the coding and modulation can be according to apply conventional techniques for LDPC or BCH (or other) coding, and conventional techniques for M-ary phase-amplitude modulation.

As illustration of certain example types from among coding and modulation types contemplated for the coding/modulation logic 234, one arbitrary scenario can include the coding/modulation logic 234 receiving a DVB-S2x BB frame from the encapsulation logic 226 having, as its assigned ModCode pair, a particular rate 1/2 LDPC code and an 8-ary APSK scheme. In response, the coding/modulation logic 234 can first apply the identified rate 1/2 LDPC coding to generate a rate 1/2 LDPC coding of the subject DVB-S2x BB frame. The logic 234 can then parse the rate 1/2 LDPC coded DVB-S2x BB frame into a succession of three-bit blocks, and map each three-bit block into another multi-bit symbol representing a position within a constellation of eight phase-amplitudes. Specific techniques for performing the above-described 8-ary parsing and symbol mapping are known and, therefore, further detailed description is omitted. The modulation and coding types used for this example are arbitrarily selected, and are not intended to imply, and should not be understood as communicating any preference as to codings or modulations usable in practices according to disclosed concepts, or aspects thereof.

Each of the remote terminals UT can include a reverse uplink transmitter (not separately visible in FIG. 2) configured to transmit, respectively, a first reverse uplink 248-1 from UT-1 and second reverse uplink 248-2 from UT-2 to the satellite 206 (collectively "reverse uplinks 248") which can re-transmit these to the ALM SGW 202 as respective reverse downlinks, collectively represented in FIG. 2 as reverse downlinks 250. The UT reverse uplink transmitters, and their respective reverse uplinks 248 and reverse downlinks 250 can be implemented, for example, as MF-TDMA (multi-frequency time division multiple access) transmitters, each being assigned respective frequency-time slots in accordance with the specific protocol that is chosen. One example can be the DVB-RCS (Digital Video Broadcasting—Return Channel via Satellite) standard EN 301 545-2 set by ETSI (European Telecommunications StandardsInstitute) which is hereby incorporated herein by reference, in its entirety.

FIG. 3 illustrates a functional block diagram of one example interference detecting and reporting remote terminal 300, for one or more systems for adaptive location-specific interference mitigation according to various aspects. For brevity, the phrase "interference detecting and reporting," as used herein in the context of "interference detecting and reporting" will be alternatively recited using the coined, arbitrary abbreviated recitation "IDR."

The IDR 300 can include a terminal receiver antenna 302 coupled to a signal input of a sub-carrier tuner 304 having an output that can feed, through a sub-carrier bandpass filter 306, an input of an A/D (analog-to-digital) converter 308. An output of the A/D 308 can feed an input of a digital QAM demodulator 310 coupled to a LDPC/BCH decoder 312. In an aspect, the IDR 300 can include a narrowband interference detector 314, and a terminal controller 316.

The sub-carrier tuner 304 can, in accordance with sub-carrier information from above-described ALM SGW 202, tune to the sub-carrier on which it will receive a frame. In an implementation, the terminal controller 316 can receive the sub-carrier assignment information (e.g., the FIG. 2 example NSK) over a control portion (not explicitly visible in the figures) of the forward uplink 204 and its forward downlink, e.g., 208-1, 208-2, then supply a corresponding tuning command TC based thereon to the sub-carrier tuner 304. The sub-carrier tuner 304 can, in response, control its local oscillator (visible in FIG. 3, but not separately numbered) to adjust its mixing frequency FTN so as to shift assigned sub-carrier to align with the sub-carrier bandpass filter 306. The sub-band bandpass filter 306 can have a bandwidth equal to that of each of the N sub-bands.

In an implementation, the terminal controller 316 can also receive from the ALM SGW 202 the modulation and coding type (e.g., as FIG. 2 notice NSK) applied by the FIG. 2 coding/modulation logic 234. The terminal controller 316, based thereon, can configure the digital QAM demodulator 310 with modulation command MD and configure the LDPC/BCH decoder 312 with coding command CP. Assuming errors in transmission do not exceed the error recovery limit of the LDPC or BCH coding, the decoder 312 can output a replica of a DVB-S2x frame. Subsequent decoding, not visible in FIG. 3, can recover the original IP packet(s) PKT.

In one implementation, the narrowband interference detector 314 can be configured to measure a power spectrum concurrently across all N sub-carrier bands. Such operation can be implemented, at least in part, as an N-point FFT device (not explicitly visible in FIG. 3). As one alternative, e.g., if higher frequency resolution is desired, the narrowband interference detector 314 can be implemented as a 2 N point, 4 N point, or larger FFT. Specific implementation can include an FFT "module" (not explicitly visible in FIG. 3), e.g., of computer-executable instructions stored in a memory coupled to one or programmable processors in the terminal controller 316. Another implementation of the narrowband interference detector 314 can include a swept bandpass filter (not explicitly visible in FIG. 3) feeding a power measurement device (not explicitly visible in FIG. 3) configured with a power threshold value, or other trigger parameters. An example implementation of the swept bandpass filter can include a tuner, such as the sub-carrier tuner 304, feeding a bandpass filter (not explicitly visible in FIG. 3) The bandpass filter may have the same or a different bandwidth as the sub-carrier bandpass filter 306.

The narrowband interference detector 314 can be configured to generate a local interference detection report, labeled "ITX," which can be an example of the FIG. 2 local interference report 230, for transmission to the described ALM SGW 202. The ITX transmission operations can be controlled, for example, by an interrupt-type interference report module stored in the terminal controller 316. In an alternative, or supplemental implementation, the narrowband interference detector 314 can be configured to send the interference reports ITX to an entity, e.g., a server hosting a monitoring service, not necessarily co-located with the described ALM SGW 202.

Figure 4:
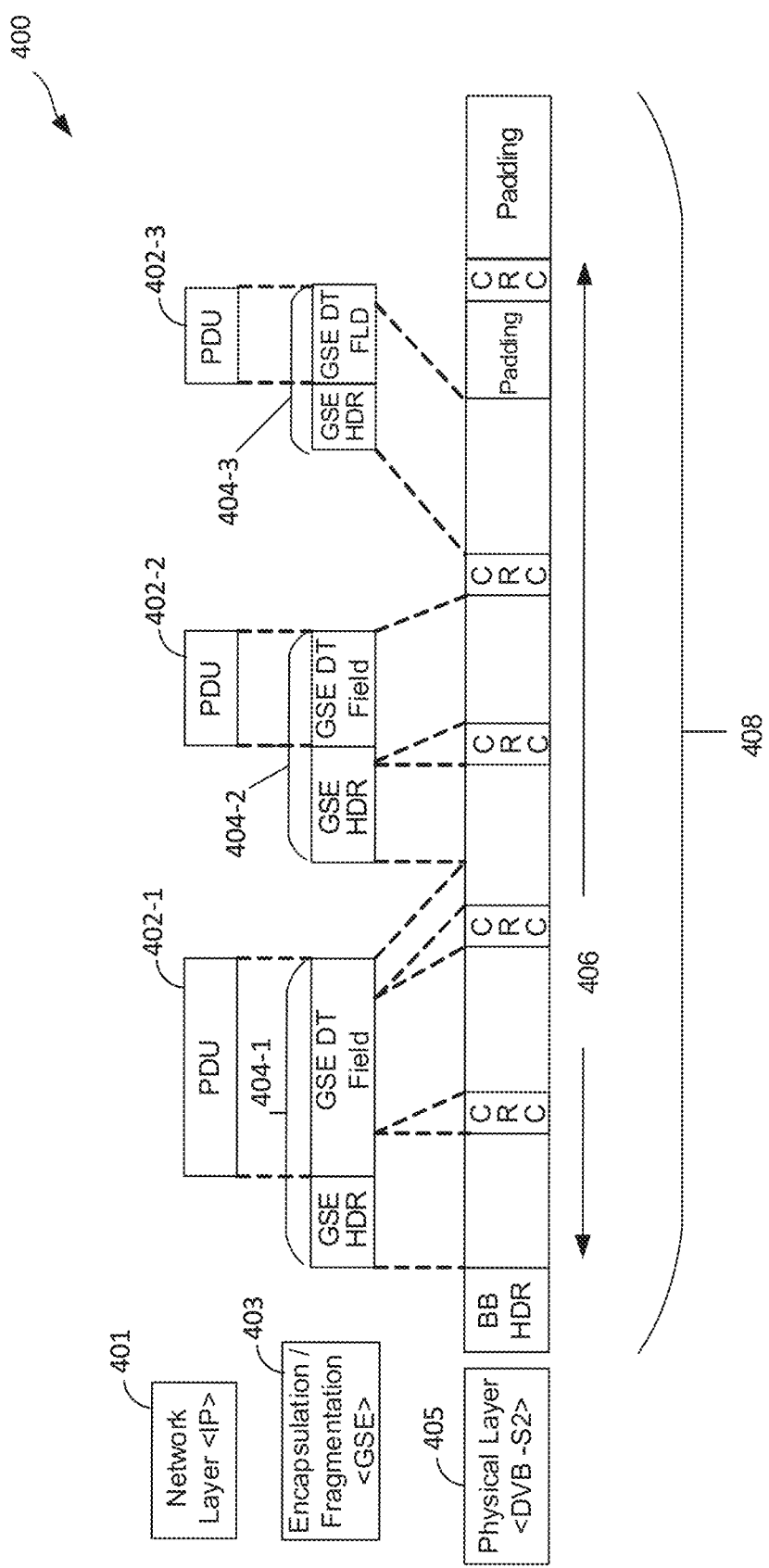
FIG. 4 illustrates an example packet physical layer codeblock, containing respective data for each of a plurality of different user terminals.

FIG. 4 illustrates an example physical layer codeblock 400 that can be generated, for example, by an implementation of the FIG. 2 encapsulation logic 226. The implementation can include encapsulating IP packets output from the ModCode queues 216, according to the Generic Stream Encapsulation (GSE) data link protocol, for carrying packetized data on a DVB-S2x physical protocol configuration of the outroute. Example operations for generating the physical layer codeblock 400 will be described. To assist the reader in tracking exemplary operations and features of the generation process, the description will refer to the FIG. 2 ALM SGW 202. This is only for convenience and is not intended to limit implementations of generating the physical layer codeblock 400 to the ALM SGW 202.

Referring to FIG. 4, the physical layer codeblock 400 can carry network layer 401 data including a network protocol first PDU (protocol data unit) 402-1, a second PDU 402-2, and a third PDU 402-3 (collectively "PDUs 402"). The destinations of the three PDUs 402 can be run-time specific. For example, all three PDUs 402 may be destined for the same end user terminal, for example UT-1. In another example, each of the three PDUs 402 may have a different remote terminal as a destination, e.g., the first PDU 402-1 may be destined for UT-2, with the second PDU 402-2 being destined for UT-2, and the third PDU 402-3 destined for another remote terminal (not visible in FIG. 2). In such an example, all remote terminals that are destinations for at least one of the PDUs 402 can receive and demodulate the codeblock 400 (using the modulation scheme inserted by the FIG. 2 encapsulation logic 226), then identify and further process only the PDUs 402 directed to them, without further expending processing resources on the remaining PDUs 402. In example operation, the modulation-coding pair assignment logic 220 can also queue all three PDUs 402 into the same ModCode queue 216 of the ModCode queueing device 218. The sub-carrier selection logic 232 can assign the three PDUs 402 the same sub-carrier, either individually before encapsulation, or during the encapsulation process. In a GSE encapsulation/fragmentation layer 403, a GSE header (visible in FIG. 4 but not separately numbered) can be prepended to each of the de-queued PDUs 402 to form a corresponding three GSE packets, e.g., the illustrated first GSE packet 404-1, second GSE packet 404-2, and third GSE packet 404-3 (collectively "GSE packets 404"). The three GSE packets 404 can then be encapsulated/fragmented into a date field 406 of a DVB-S2x baseband (BB) physical layer 405 frame 408. The FIG. 2 example illustrates the entirety of each of the GSE packets 404 being in the data field 406 of the same DVB-S2x BB physical layer frame 408. However, GSE packets 404 can be fragmented into multiple DVB-S2x physical layer frames 408.

Figure 5:
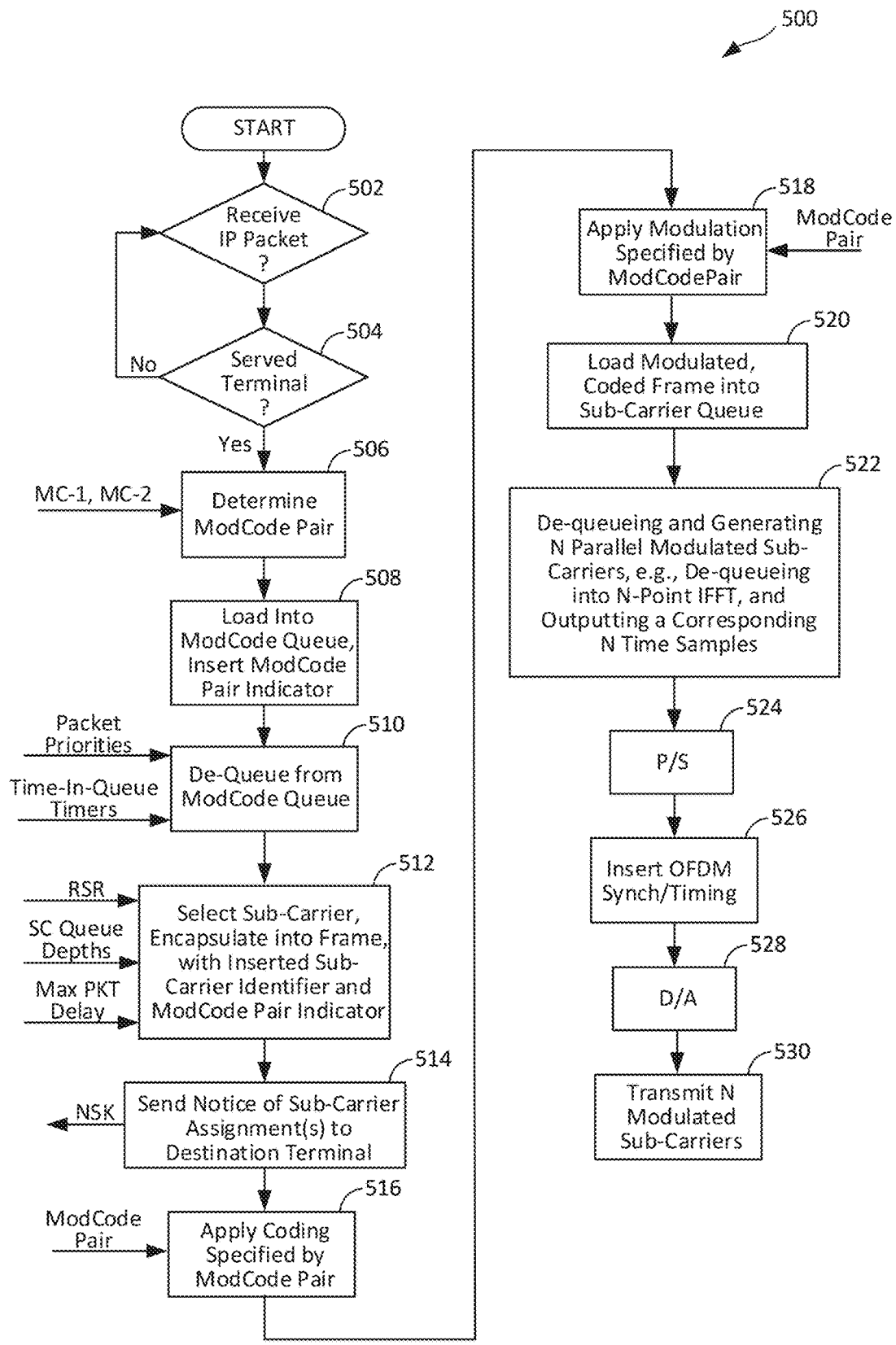
FIG. 5 illustrates a flow of example operations in certain processes in a method for adaptive location-specific interference mitigation according to various aspects.

FIG. 5 illustrates a flow 500 of example operations in a process according to a method for adaptive location-specific interference mitigation according to various aspects. An example of a process instance according to the flow 500 will be described in reference to the FIG. 2 system 200 and the FIG. 3 interference detecting terminal receiver 300. The flow 500 will also illustrate an example update of the interference map.

Referring to FIG. 5, an example instance can proceed from an arbitrary Start and proceed to wait for an IP packet at 502 and, upon receiving an IP packet, such as a FIG. 2 packet PKT at the input scheduler logic 214, the flow 500 can proceed to 504 and determine if the packet destination is one of the remote terminals, e.g., UT-1 or UT-2, served by or through the AML SWG 202. Upon a "yes" at 504 the flow 500 can proceed to 506, where operations can determine an appropriate modulation-coding pair, e.g., an appropriate ModCode pair. The determination at 506 can include receipt of general channel conditions at the destination terminal, as described above for the modulation-coding pair assignment logic 220. Upon determining the appropriate modulation-coding pair, the flow 500 can proceed to 508 and load the IP packet into the ModCode queue for the assigned modulation-coding pair, e.g., one of the ModCode queues 216 of the ModCode queueing device 218. Operations at 508 can also include appending an indication of the assigned ModCode pair onto, or inserting it into the loaded packet. The 500 can proceed from 508 to 510 where operations can de-queue the IP packet from the ModCode queue into which the packet was inserted by the input scheduler logic 214. Operations at 510 can be performed, for example, by the FIG. 2 output scheduler-ModCode de-queueing logic 224, based, at least in part, on the packets' relative priorities, as described above.

Upon the de-queueing at 510, the flow 500 can proceed to 512 where operations, e.g., by a co-operative operation of the encapsulation logic 226 and the sub-carrier election logic 232, as described above, can select for the encapsulation frame a sub-carrier among the N sub-carriers, and then encapsulate and fragment the IP packet into that frame in a structure, for example, according to DVB-S2x protocol. Operations at 512 can also include inserting into the frame an identifier of the selected sub-carrier, as well as the ModCode pair assigned at 504.

Operations at 512 in selecting the sub-carrier selection at 512 can, as described above, limit the selection to avoid local interference at the destination terminal, if any. Accordingly, FIG. 5 illustrates the terminal interference map 228 as an input to 512. In an aspect, operations at 512 in selecting the sub-carrier selection can include, as described above, weighing or other consideration of the destination terminal's current receive symbol rate based, for example, on the number of different sub-carriers that the terminal is configured to receive. FIG. 5 illustrates, as an input to 512, an example of such a receive symbol rate as "RSR." Also, in an aspect as described above, operations applied at 512 in the sub-carrier selection can include a weighing of the respective depths of the sub-carrier queues, together with the constraints defined or set by the terminal interference map 228. FIG. 5 illustrates, accordingly, as another input to 512, an example of such sub-carrier queue depths as "SC-Queue Depths." Operations applied at 512 in the sub-carrier selection can also include, in selecting the sub-carrier, delay constraints for the IP packets, e.g., specified by QoS parameters in the received IP packets. Such operations can weigh or otherwise factor these delay constraints—with the SC-Queue Depth information—together with constraints set by the terminal interference map 228. FIG. 5 illustrates, accordingly, as another input to 512, an example of IP packet delay constraints as "Max PKT Delay." The flow 500 can include, as illustrated by block 514, operations of sending to the frame's destination terminal a notice of the sub-carrier that is assigned.

Referring to FIG. 5, the flow 500 can proceed from 514 to 516, where a coding according to the modulation-coding pair assigned at 506 can be applied, for example, by the FIG. 2 coding-modulation logic 234. Operations at 516 can generate a coded version of the frame, e.g., an LDPC or BCH coded version. Operations at 516 can include, for example, the coding-modulation logic 234 obtaining, or being provided with the identifier of the modulation-coding pair that was earlier inserted in the frame. FIG. 5 illustrates, as an example, an input to 516 of "ModCode Pair." The flow 500 can proceed from 516 to 518, where the modulation specified by the frame's assigned modulation-coding pair can be applied. Example operations at 518 can include, as described above, the coding-modulation logic 234 parsing the coded version of the baseband encapsulation frame into a succession of blocks, e.g., one-bit (for BPSK) multi-bit, and converting each block to an M-ary APSK symbol within the modulation scheme defined by the assigned modulation-coding pair.

The flow 500 can then proceed to 520 where operations, for example, by a sub-carrier de-multiplex logic (not separately visible in FIG. 2) for the sub-carrier queueing device 236, can load the modulation form of the encoded encapsulation frame into the sub-carrier queue 238 of that assigned sub-carrier. The flow 500 can proceed from 520 to 522 and apply a de-queuing and N modulated sub-carrier generation process. An example of the process at 522 can include an incremental parallel de-queuing and loading into the N-point IFFT block 242 of one coded and modulated frame from each of the sub-carrier queues 238, as described above in reference to FIG. 2. Operations at 522 can include the N-point IFFT block 244 generating N parallel time-domain outputs for each iteration of the N sub-carrier queues 242 loading the N inputs of block 244. Partially overlapping with operations at 522, the flow 500 can, at 524, convert the N parallel time-domain outputs into a serial stream, for example, by the N:1 P/S multiplexer 246. In step with 524, the flow 500 can, at 526, insert OFDM synch/timing signals, and at 528 perform a D/A conversion of the serial stream from the N:1 P/S multiplexer 244 into an analog stream. The analog stream can be a time superposition of N modulated sub-carriers spaced in frequency and the flow 500, at 530, can transmit this to the remote terminals.

Figure 6A:
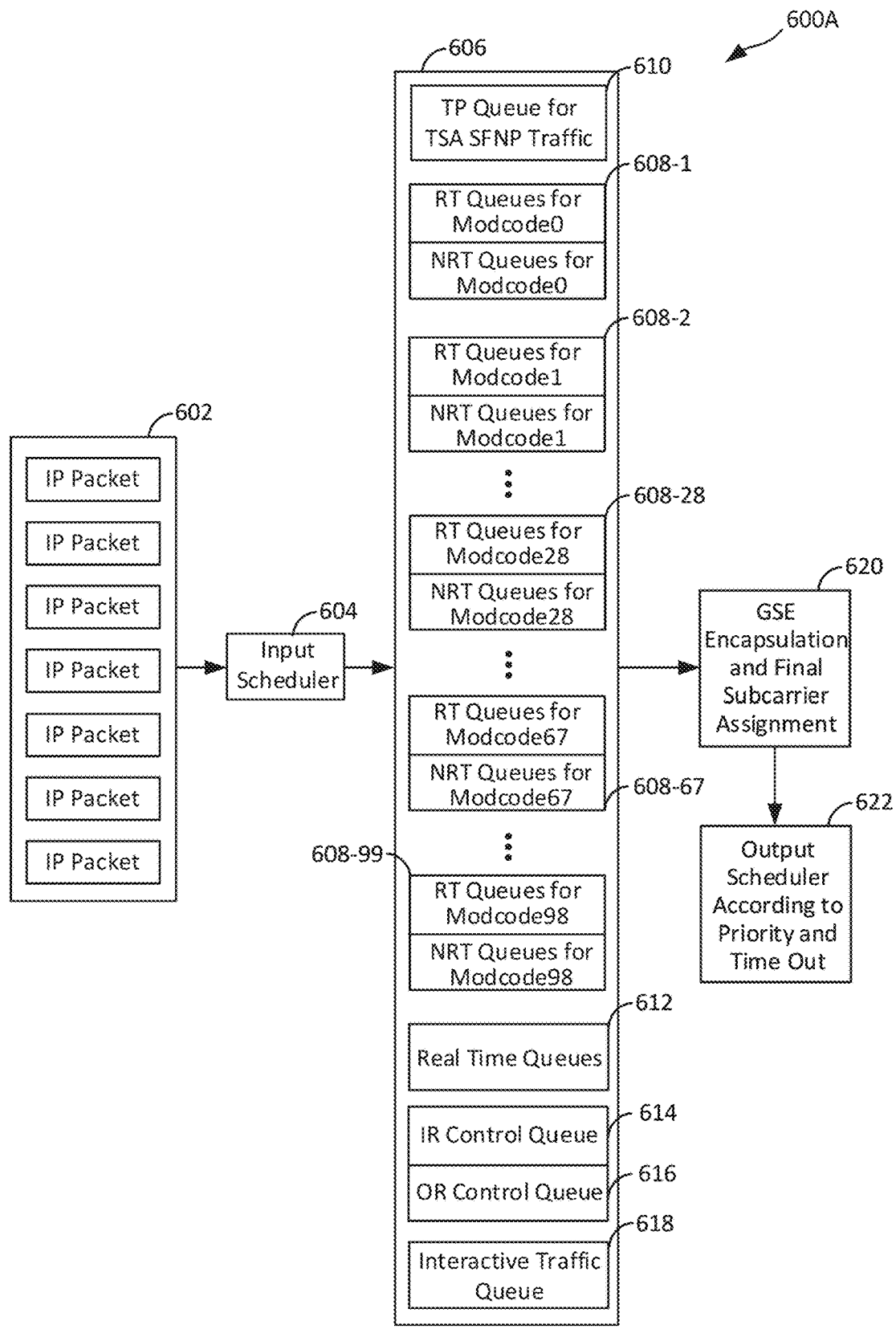
FIG. 6A-6B illustrate block diagrams of respective portions of an example multiple sub-carrier hub, for one or more systems and methods for adaptive location-specific interference mitigation according to various aspects.
Figure 6B:
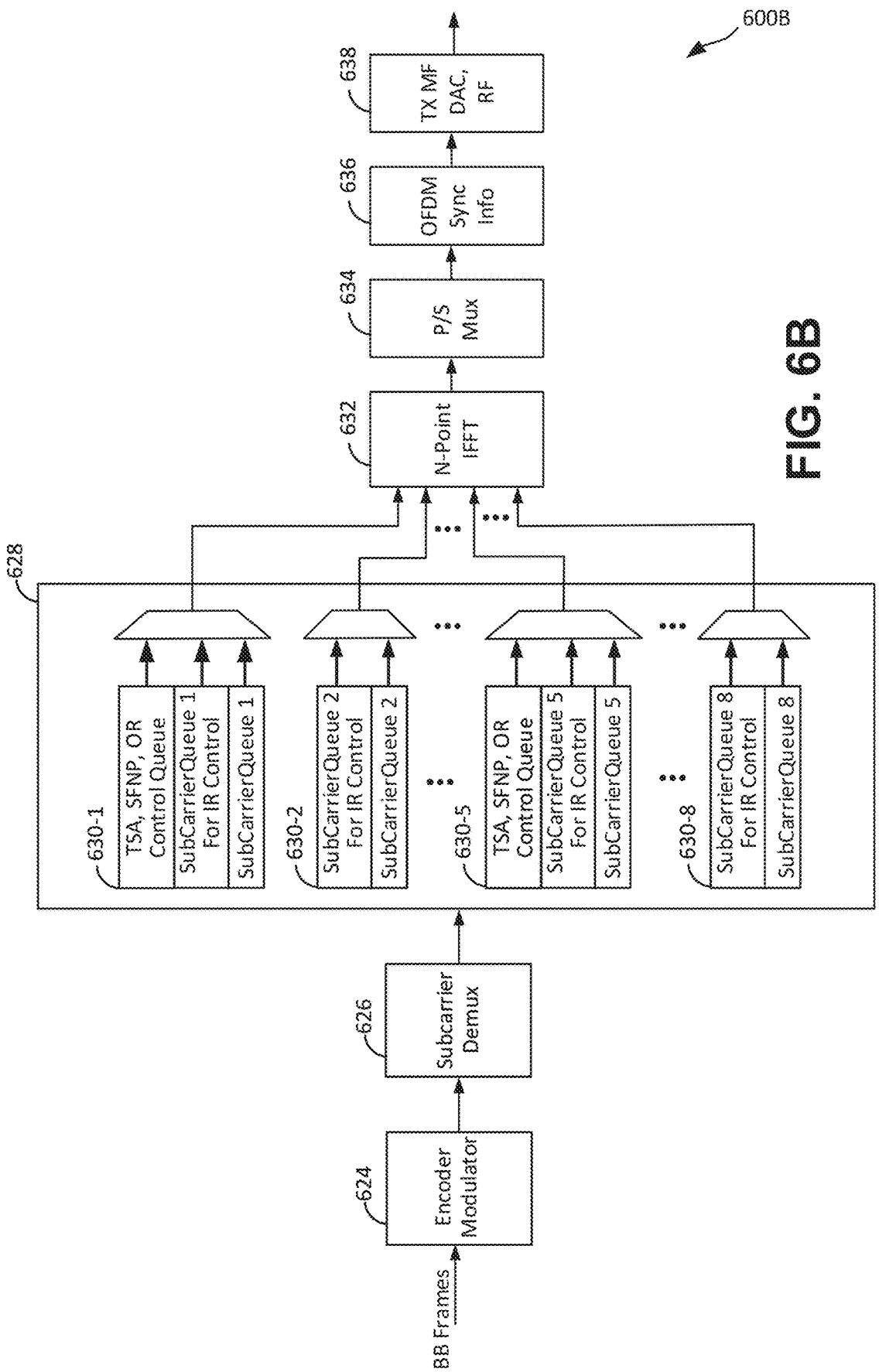

FIGS. 6A and 6B illustrate portions 600A and 600B, respectively, of a block diagram of one implementation of an adaptive interference mitigating hub for one or more systems and methods for adaptive location-specific interference mitigation according to various aspects. For brevity, an example hub according to the portions 600A and 600B will be referred to as the "adaptive local interference mitigating hub 600," which will be alternatively recited using the coined abbreviation "ALM hub 600." The ALM hub 600 can be one implementation, for example, of the ALM SGW 202 in the FIG. 2 bent-pipe satellite based, star network system 200.

Referring to FIG. 6A, the ALM hub portion 600A can include an IP packet buffer 602 that, in an implementation, can be selectively read by an input scheduler 604. The input scheduler 604 can route the IP packets into one of an array or plurality of differently tasked queues within a ModCode/control queue array 606. In an example, the ModCode/control queue array 606 can include a plurality, for example integer 99, of ModCode queues, examples of which are labeled 608-1, 608-2, . . . 608-98 (collectively "ModCode queues 608"). As illustrated, each of the ModCode queues 608 can include an NRT (non-real time) queue and an RT (real time) queue (both being visible in FIG. 6A, but not separately numbered). RT packets can carry, for example, voice data. Assignment to a ModCode queues 608 can effectuate the assignment of ModCode pair performed by the FIG. 2 logic 216. In addition, the ModCode queue array 606 can include a TP (transponder) queue 610 that can queue TSA (Timing Synchronization Algorithm), SFNP (Superframe Numbering Packet) traffic. TSA and SFNP traffic can be used by remote terminals, e.g., UT-1 and UT-2, to synchronize their TDM reception and TDMA communication. Examples of SFNP traffic can be, for example, as described in U.S. Pat. No. 8,711,759, filed Jun. 29, 2012, issued Apr. 29, 2014, and which is hereby incorporated by reference in its entirety. Examples of TSA traffic can be, for example, as described in U.S. Publication 2016/0352544, filed May 25, 2016, published Dec. 1, 2016, and which is hereby incorporated by reference in its entirety.

The ModCode queue array 606 can include real time queues 612, an IR (inroute) control queue 614, an OR (outroute) control queue 616, and an interactive traffic queue 618. IR control queues and OR control queues can have higher priority than other traffic queues. The adaptive multiple sub-carrier hub 600 can also include a GSE encapsulation and final sub-carrier assignment block 620, with "final" meaning in reference to the encapsulation frame. The GSE encapsulation functionality of block 620 can be in accordance with the above-described encapsulation functionality of the FIG. 2 encapsulation logic 236, configured according to the GSE standard under DVB-S2x. The adaptive multiple sub-carrier hub 600 can include a logic 622 providing output scheduling according to priority and timeout, which can be a particular configuration of the FIG. 2 output scheduler-ModCode de-queueing logic 224.

Referring to FIG. 6B, the ALM hub portion 600B can include an encoder-modulator 624 that can apply a coding and modulation according to the ModCode queue 608 from which the packets encapsulated by the GSE encapsulation and final sub-carrier assignment block 620 were read. The encoder-modulator 624 can be configured, for example, according to the FIG. 2 modulation-coding logic 234. The encoder-modulator 624 can feed a sub-carrier demux 626 that can load the encoded-modulation form of the encapsulation packets output from the encoder-modulator 624, into a queue within the sub-carrier queueing device 628 corresponding to the sub-carrier assigned by the FIG. 6A block 620. The sub-carrier queues within the sub-carrier queueing device 628 can include sub-carrier queues 630-1 through 630-8, all of which can include a corresponding sub-carrier queue (visible but not separately numbered) for inroute control, and some of which, e.g., sub-carrier queues 630-1 and 630-5, can include a TSA SFNP outroute control queue (visible but not separately numbered). Each of the sub-carrier queues 630-1 through 630-8 can feed a multiplexer (visible but not separately numbered) configured to select among its constituent queues. The sub-carrier queueing device 628 can feed an N-point IFFT block 632, N being 8 in the illustrated example, which can be according to the FIG. 2 N-point IFFT block 242. The N-point IFFT block 632 can feed a parallel to serial mux 634 that can feed an OFDM timing insertion block 636 that, in turn can feed a digital-in-RF-out multi-carrier transmission device 638.

FIG. 7 is a block diagram illustrating a computer system 700 upon which aspects of this disclosure may be implemented, such as, but not limited to, particular logic blocks described in reference to FIG. 1. It will be understood that logic blocks illustrated in FIG. 7 represent functions, and do not necessarily correspond to particular hardware on a one-to-one basis. The computer system 700 can include a data processor 702, instruction memory 704, and a general-purpose memory 706, coupled by a bus 708.

The instruction memory 706 can include a tangible medium retrievably storing computer-readable instructions that, when executed by the data processor 702, cause the processor to perform operations, such as described in reference to FIG. 5.

The computer system 700 can also include a communications interface 710, configured to interface with a local network 712 for accessing a local server 714, and to communicate through an Internet service provider (ISP) 716 to the Internet 718, and access a remote server 720. The computer system 700 can also include a display 722 and a user interface 724, such as a touchscreen or keypad.

The terms "IDR" "ITX," as used in this disclosure, are coined names introduced for convenience of description, and have no inherent or otherwise limitative meaning, either in this written description or in the scope of the appended claims, as originally filed and as issued in any patent that issues from or claims priority to this disclosure.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 700, various machine-readable media are involved, for example, in providing instructions to processor 702 for execution. Such a medium may take many forms, including but not limited to, non-volatile media, volatile media, and transmission media. Non-volatile media includes, for example, optical or magnetic disks. Volatile media includes such dynamic memory. Transmission media includes coaxial cables, copper wire and fiber optics, including the wires that comprise bus 708. Transmission media can also take the form of acoustic or light waves, such as those generated during radio wave and infra-red data communications. All such media must be tangible to enable the instructions carried by the media to be detected by a physical mechanism that reads the instructions into a machine.

Various forms of machine-readable media may be involved in carrying one or more sequences of one or more instructions to processor 702 for execution. For example, the instructions may initially be carried on a magnetic disk of a remote computer. The remote computer can load the instructions into its dynamic memory and send the instructions over, for example, a telephone line using a modem. A modem local to computer system 700 can receive the data on the telephone line and use, for example, an infrared transmitter to convert the data to an infrared signal. An infrared detector can receive the data carried in the infrared signal and appropriate circuitry can place the data on bus 708. Bus 708 can carry the data to the instruction memory 704, from which processor 702 retrieves and executes the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. The following claims are hereby incorporated into the Detailed Description, with each claim standing on its own as a separately claimed subject matter.

What is claimed is:

1. A system for mitigation of interference local to remote terminals, comprising wherein the plurality of sub-carriers includes N sub-carriers, N being an integer:
    a memory, configured to store a local interference data indicating, for a first remote terminal, a local interference to reception of one or more among a plurality of sub-carriers;
    a sub-carrier assignment logic, configured to determine the remote terminal being a destination terminal for a packet and, in response, to
        select, based at least in part on the local interference data, a sub-carrier among the sub-carriers not indicated as having local interference to reception at the remote terminal, and
        generate a sub-carrier assignment data, addressed to the destination terminal, identifying the selected sub-carrier;
    a modulated signal generator configured to generate, based at least in part on a content of the packet, a modulated sub-carrier signal;
    a wireless transmitter, configured to wirelessly transmit, for receipt at least at the destination terminal, a sub-carrier assignment notice carrying the sub-carrier assignment data, and an amplified modulated wireless sub-carrier signal, based at least in part on the modulated sub-carrier signal;
    a queue associated with each of the N sub-carriers;
    a logic configured to load a content of the packet into the queue associated with the selected sub-carrier;
    a logic configured to de-queue the content of the packet and input the de-queued content to the modulated signal generator; and
    a logic configured to detect a current fill depth of the queues,
    wherein:
        the sub-carrier assignment logic is further configured to select sub-carriers further based, at least in part, on the current fill depth of the queues.

2. The system of claim 1, wherein the sub-carrier assignment logic is further configured to:
    instruct at least one of the remote terminals to switch to a mode of concurrently receiving two or more of the sub-carriers, and
    upon receiving a packet having, as the destination terminal, at least one of the remote terminals instructed to switch to the mode of receiving two or more of the sub-carriers to select the sub-carrier for the packet based on a weighting of factors that include, in combination:

a symbol receive rate, the symbol receive rate being based, at least in part, on the number of concurrently received sub-carriers, and the current fill depth of the queues.

3. The system of claim 1, wherein:

the sub-carrier assignment logic is further configured to further base selection of a sub-carrier, upon the local interference data indicating more than one sub-carrier being available at the destination terminal, as being determined at least in part on the sub-carrier having a sub-carrier queue with the minimum delay.

4. The system of claim 1, wherein the sub-carrier assignment logic is further configured to:

detect a do-not-exceed delay parameter associated with the packet and, in response to further configure the selection to select a sub-carrier that provides a delay that meets the do-not-exceed delay parameter.

5. The system of claim 1, wherein the system further includes:

an encapsulation logic, configured to encapsulate the packet in an encapsulation frame, and a modulation-coding logic, configured to generate a modulation symbol stream based at least in part on the content of the packet, wherein the modulated signal generator is further configured to generate the local modulated sub-carrier signal based at least in part on the modulation symbol stream.

6. The system of claim 5, wherein the system further includes:

a modulation-coding assignment logic, configured to assign to the packet a modulation-coding pair, the modulation-coding pair indicating a particular coding to be applied to the encapsulation frame, and a particular modulation to be applied by the modulated signal generator to a result of the coding;

a modulation-coding queueing device, including a plurality of modulation-coding queues, each of the modulation-coding queues being associated with a particular modulation-coding pair;

an input scheduler logic, configured to load the packet into the modulation-coding queue associated with the assigned modulation-coding pair; and a modulation-coding de-queueing logic, configured to de-queue packets from the modulation-coding queueing device, in an ordering based at least in part on relative priorities of the packets in the modulation-coding queues.

7. The system of claim 6, wherein the system further includes:

at least one timer associated with each of the modulation-coding queues;

a timer setting logic, configured to reset one of the timers in association with the loading of the packet into the modulation-coding queue associated with the assigned modulation-coding pair, wherein the modulation-coding de-queueing logic is further configured to de-queue packets further based, at least in part, on the timer and a given time-out criterion.

8. A system for mitigation of interference local to remote terminals, comprising:

a memory, configured to store a local interference data indicating, for a remote terminal, a local interference at the remote terminal to reception of one or more among a plurality of sub-carriers;

a sub-carrier assignment logic, configured to determine the remote terminal being a destination terminal for a packet and, in response, to select for the remote terminal, based at least in part on the local interference data, a sub-carrier among the sub-carriers not indicated as having local interference to reception at the remote terminal, and generate a sub-carrier assignment data, addressed to the destination terminal, identifying the sub-carrier selected for the remote terminal;

an encapsulation logic, configured to encapsulate the packet in an encapsulation frame;

a modulation-coding logic, configured to generate a modulation symbol stream based at least in part on the content of the packet;

a modulated signal generator, configured to generate a local modulated sub-carrier signal based at least in part on the modulation symbol stream; and a wireless transmitter, configured to wirelessly transmit, for receipt at least at the destination terminal, a sub-carrier assignment notice carrying the sub-carrier assignment data, and an amplified modulated wireless sub-carrier signal, based at least in part on the modulated sub-carrier signal, wherein:

the packet is a first packet, the local interference data indicates:

for the first remote terminal, a local interference to reception of a given one of the sub-carriers, and for a second remote terminal, a local interference to reception of the given one of the sub-carriers, the sub-carrier assignment logic is further configured to determine the second remote terminal being a destination for a second packet, the encapsulation logic is further configured to encapsulate the second packet and the first packet in the encapsulation frame, based at least in part on the local interference data indicating reception of at least one of the sub-carriers at both the first remote terminal and the second remote terminal, and the sub-carrier assignment logic is further configured to assign to the encapsulation frame a sub-carrier other than the given one of the sub-carriers.

9. A method for mitigation of interference local to remote terminals, comprising:

receiving a packet indicating any of the remote terminals as a destination terminal;

accessing a given local interference data to determine whether any sub-carriers among a given plurality of sub-carriers are indicated as having local interference to reception at the destination terminal;

loading a content of the packet into the queue associated with the selected sub-carrier;

detecting a current fill depth of the queues;

selecting, for the remote terminal, a sub-carrier for sending the packet to the remote terminal, from among the sub-carriers indicated by the local interference data as not having local interference to reception at the destination terminal, wherein selecting the sub-carrier is based, at least in part, on the current fill depth of the queues;

transmitting to the destination terminal a sub-carrier assignment data, identifying the sub-carrier selected for the remote terminal; and wireless transmitting, for receipt by at least at the destination terminal, a wireless modulation of the selected sub-carrier, the modulation carrying an information from which a content of the packet can be extracted, wherein the wireless transmitting includes de-queueing the content of the packet as an input to the wireless transmitting.

10. The method of claim 9, wherein the method further includes:
instructing at least one of the remote terminals to switch to a mode of concurrently receiving two or more of the sub-carriers, and
upon receiving a packet having, as the destination terminal, at least one of the remote terminals instructed to switch to the mode of receiving two or more of the sub-carriers, selecting the sub-carrier for the packet based on a weighting of factors that include, in combination:
a symbol receive rate, the symbol receive rate being based, at least in part, on the number of concurrently received sub-carriers, and
the current fill depth of the queues.

11. The method of claim 10, wherein:
upon the local interference data indicating more than one sub-carrier being available at the destination terminal, selecting the sub-carrier is further based, at least in part, on the sub-carrier having a sub-carrier queue with the minimum delay.

12. A method for mitigation of interference local to remote terminals, comprising:
receiving a packet indicating any of the remote terminals as a destination terminal;
assigning to the packet a modulation-coding pair, the modulation-coding pair indicating a particular coding to be applied to the packet, and a particular modulation to be applied to a result of the coding;
loading the packet into a modulation-coding queue associated with the assigned modulation-coding pair;
de-queuing the packet from the modulation-coding queue, in an ordering relative to modulation-coding queues associated with the other modulation-coding pairs, based at least in part on relative priorities of the packets in the modulation-coding queues
accessing a given local interference data to determine whether any sub-carriers among a given plurality of sub-carriers are indicated as having local interference to reception at the destination terminal;
selecting, for the remote terminal, a sub-carrier for sending the packet to the remote terminal, from among the sub-carriers indicated by the local interference data as not having local interference to reception at the destination terminal;
encapsulating the packet in the encapsulation frame;
generating a modulation symbol stream based at least in part on the content of the packet in the encapsulation frame;
transmitting to the destination terminal a sub-carrier assignment data, identifying the sub-carrier selected for the remote terminal; and
wireless transmitting, for receipt by at least at the destination terminal, a wireless modulation of the selected sub-carrier, the wireless modulation of the sub-carrier being based, at least in part, on the modulation symbol stream, and the wireless modulation carrying an information from which a content of the packet can be extracted.

13. The method of claim 12, wherein the method further includes:
setting a timer in association with the loading of the packet into the modulation-coding queue associated with the assigned modulation-coding pair, wherein the de-queueing is based at least in part on the timer and a time-out criterion.

14. The method of claim 12, wherein:
the packet is a first packet, and
the local interference data indicates:
for the first remote terminal, a local interference to reception of a given one of the sub-carriers, and
for a second remote terminal, a local interference to reception of the given one of the sub-carriers, and
wherein the method further includes:
upon determining the second remote terminal being a destination for a second packet,
encapsulating the second packet and the first packet in the encapsulation frame, based at least in part on the local interference data indicating reception of at least one of the sub-carriers at both the first remote terminal and the second remote terminal, and
assigning to the encapsulation frame a sub-carrier other than the given one of the sub-carriers.

\* \* \* \* \*